(12) United States Patent
Milde, Jr.

(10) Patent No.: US 10,264,395 B1
(45) Date of Patent: Apr. 16, 2019

(54) METHOD AND APPARATUS FOR GENERATING AN ALERT THAT A GUN HAS ENTERED A PROTECTED AREA ("SAFE ZONE")

(71) Applicant: Karl F. Milde, Jr., Somers, NY (US)

(72) Inventor: Karl F. Milde, Jr., Somers, NY (US)

( * ) Notice: Subject to any disclaimer, the term of this patent is extended or adjusted under 35 U.S.C. 154(b) by 16 days.

(21) Appl. No.: 15/989,401

(22) Filed: May 25, 2018

Related U.S. Application Data

(60) Provisional application No. 62/634,338, filed on Feb. 23, 2018.

(51) Int. Cl.
| | |
|---|---|
| *H04W 4/80* | (2018.01) |
| *H04W 4/90* | (2018.01) |
| *F41A 17/06* | (2006.01) |
| *G01S 19/17* | (2010.01) |
| *H04W 4/021* | (2018.01) |

(52) U.S. Cl.
CPC .......... *H04W 4/021* (2013.01); *F41A 17/063* (2013.01); *G01S 19/17* (2013.01); *H04W 4/80* (2018.02); *H04W 4/90* (2018.02)

(58) Field of Classification Search
CPC ...................................................... F41A 17/08
See application file for complete search history.

(56) References Cited

U.S. PATENT DOCUMENTS

| | | | | |
|---|---|---|---|---|
| 2004/0214598 | A1* | 10/2004 | Parameswaran Rajamma | ............ G01S 13/04 455/556.1 |
| 2005/0085257 | A1* | 4/2005 | Laird | ....................... A61B 5/04 455/550.1 |
| 2014/0173959 | A1* | 6/2014 | Kountotsis | ............ F41A 17/063 42/1.02 |
| 2014/0366421 | A1* | 12/2014 | Arif | ....................... F41A 17/063 42/70.11 |
| 2015/0047242 | A1* | 2/2015 | Kountotsis | .............. F41C 27/00 42/6 |
| 2015/0123787 | A1* | 5/2015 | Watson | .............. G08B 21/0415 340/539.13 |
| 2016/0033222 | A1* | 2/2016 | Milde, Jr. | ............. F41A 17/063 42/70.11 |
| 2017/0160065 | A1* | 6/2017 | Nath | ....................... F42C 15/42 |
| 2018/0054713 | A1* | 2/2018 | South | ...................... H04W 4/04 |

* cited by examiner

*Primary Examiner* — Charles N Appiah
*Assistant Examiner* — Frank E Donado
(74) *Attorney, Agent, or Firm* — Karl F. Milde, Jr.

(57) ABSTRACT

A method for alerting the authorities that a person with a gun has entered a safe zone includes the steps of:

(a) downloading to an app-enabled, and GPS-enabled, smartphone the coordinates of one or more safe zones in which the unauthorized presence of guns is prohibited;

(b) when said smartphone enters a safe zone, sensing the presence of any gun that is in the vicinity of said smartphone; and (c) if the presence of a gun is sensed in the vicinity of said smartphone, transmitting an alert message by means of said smartphone to a central office for the attention of security forces.

Apparatus for carrying out this method includes a transponder tag attached to a gun and an app-enabled, and GPS-enabled, smartphone capable of determining when the smartphone is within a safe zone and capable of sensing the presence of the transponder tag.

5 Claims, 1 Drawing Sheet

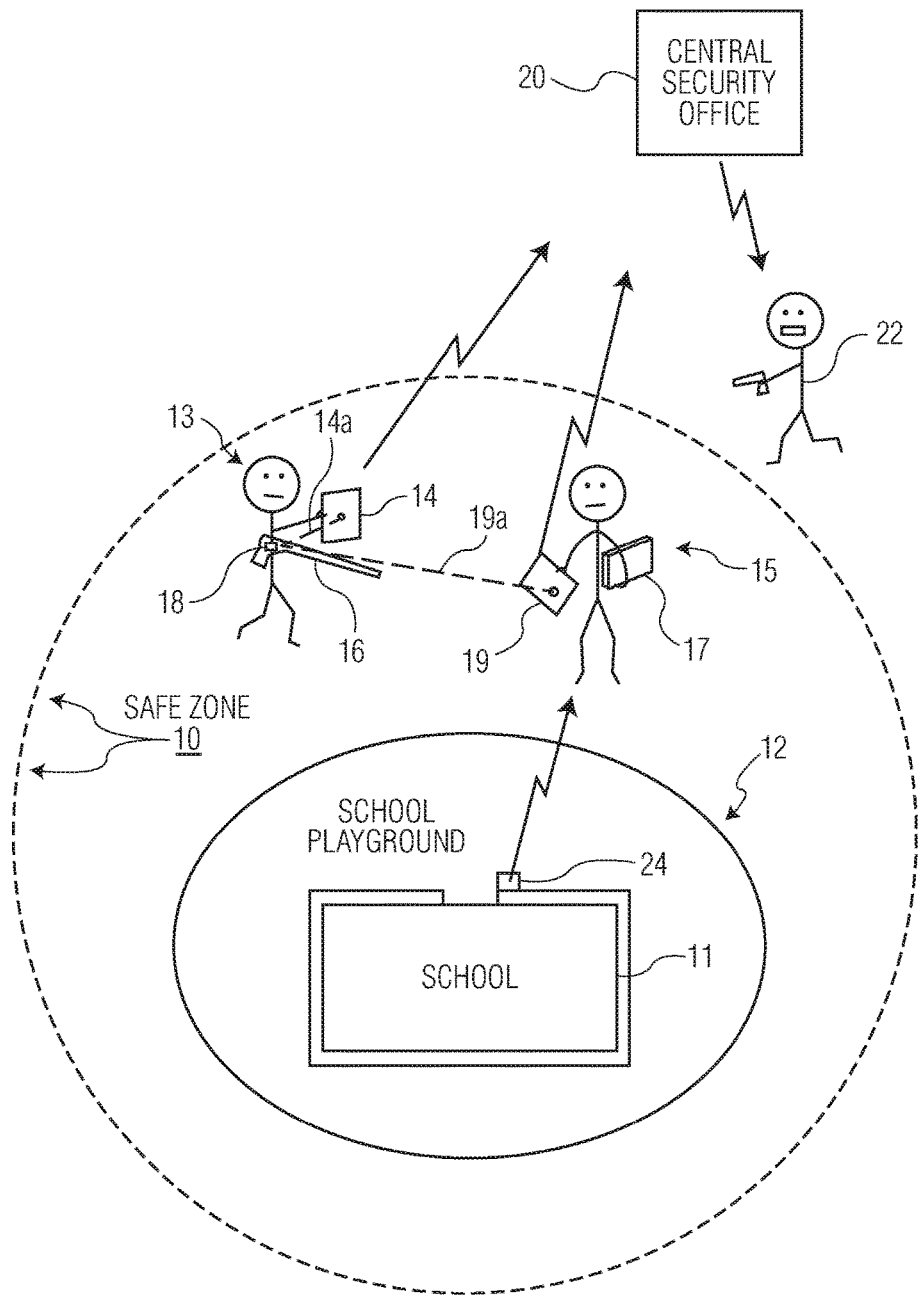

METHOD AND APPARATUS FOR GENERATING AN ALERT THAT A GUN HAS ENTERED A PROTECTED AREA ("SAFE ZONE")

The present application claims priority from the U.S. Provisional Application No. 62/634,338 filed Feb. 23, 2018.

This application is also related to the following U.S. Patent Applications:

(1) Provisional Application No. 61/761,270, filed Feb. 6, 2013, entitled "SECURE SMARTPHONE-OPERATED GUN TRIGGER LOCK;"

(2) Patent application Ser. No. 13/763,951, filed Feb. 11, 2013, entitled "SECURE SMARTPHONE-OPERATED GUN TRIGGER LOCK" (now U.S. Pat. No. 8,893,420);

(3) Provisional Application No. 61/841,559, filed Jul. 1, 2013, entitled "SECURE SMARTPHONE-OPERATED GUN LOCK";

(4) Patent application Ser. No. 14/017,666 filed Sep. 4, 2013, entitled "SECURE SMARTPHONE-OPERATED GUN TRIGGER LOCK" (now U.S. Pat. No. 8,919,024);

(5) Patent application Ser. No. 14/140,658, filed Dec. 26, 2013, entitled "SECURE SMARTPHONE-OPERATED GUN LOCK WITH MEANS FOR OVERRIDING RELEASE OF THE LOCK" (now U.S. Pat. No. 8,931,195);

(6) Patent application Ser. No. 14/513,344, filed Oct. 14, 2014, and entitled "SECURE SMARTPHONE-OPERATED GUN LOCK WITH MEANS FOR OVERRIDING RELEASE OF THE LOCK" (now U.S. Pat. No. 9,316,454);

(7) Patent application Ser. No. 14/562,854, filed Dec. 8, 2014, entitled "SECURE SMARTPHONE-OPERATED GUN LOCK WITH MEANS FOR OVERRIDING RELEASE OF THE LOCK" (now U.S. Pat. No. 9,303,935);

(8) Patent application Ser. No. 15/050,643, filed Feb. 23, 2016, entitled "SECURE SMARTPHONE-OPERATED GUN LOCK WITH MEANS FOR OVERRIDING RELEASE OF THE LOCK" (now U.S. Pat. No. 9,551,543);

(9) Patent application Ser. No. 15/063,665, filed Mar. 8, 2016, entitled "SECURE SMARTPHONE-OPERATED GUN LOCK WITH MEANS FOR OVERRIDING RELEASE OF THE LOCK" (now U.S. Pat. No. 9,644,912);

(10) Patent application Ser. No. 15/432,140, filed Feb. 14, 2017, entitled "SECURE SMARTPHONE-OPERATED GUN LOCK WITH MEANS FOR OVERRIDING RELEASE OF THE LOCK" (now U.S. Pat. No. 9,803,942);

(11) Patent application Ser. No. 15/472,469, filed Mar. 29, 2017, entitled "SECURE SMARTPHONE-OPERATED GUN LOCK WITH MEANS FOR OVERRIDING RELEASE OF THE LOCK" (now U.S. Pat. No. 9,746,265);

(12) Patent application Ser. No. 15/658,859, filed Jul. 25, 2017, entitled "SECURE SMARTPHONE-OPERATED GUN LOCK WITH MEANS FOR OVERRIDING RELEASE OF THE LOCK" (allowed); and

(13) Patent application Ser. No. 15/728,741, filed Oct. 10, 2017, entitled "SECURE SMARTPHONE-OPERATED GUN LOCK WITH APPARATUS FOR PREVENTING FIRING IN PROTECTED DIRECTIONS."

To the fullest extent permitted by law, the disclosures of these patent applications and patents are incorporated herein by reference.

BACKGROUND OF THE INVENTION

The present invention relates to a method and apparatus for alerting the authorities when a person holding a gun enters a "safe zone" such as a school, a place of worship, a government building or an airport, where the only guns that are permitted are those carried by security officers (the local and federal police, private security officers and the like).

Certain areas, such as school zones, children's playgrounds, houses of worship, government buildings and public places such as airports, malls and parks where people congregate, appear to be likely targets for active shooters. Police and private security forces are called upon to guard against acts of violence, but rarely do they know in advance when and if a shooting will occur.

Radio-frequency identification (RFID) uses electromagnetic fields to automatically identify and track tags attached to objects. The tags contain electronically-stored information. Passive tags collect energy from a nearby RFID reader's interrogating radio waves. Active tags have a local power source (such as a battery) and may operate hundreds of meters from the RFID reader. Unlike a barcode, the tag need not be within the line of sight of the reader, so it may be embedded in the tracked object.

A complete radio-frequency identification system uses tags, or labels attached to the objects to be identified. Two-way radio transmitter-receivers called interrogators or readers send a signal to the tag and read its response.

RFID tags can be either passive, active or battery-assisted passive. An active tag has an on-board battery and periodically transmits its ID signal. A battery-assisted passive (BAP) has a small battery on board and is activated when in the presence of an RFID reader. A passive tag is cheaper and smaller because it has no battery; instead, the tag uses the radio energy transmitted by the reader. However, to operate a passive tag, it must be illuminated with a power level roughly a thousand times stronger than for signal transmission. That makes a difference in interference and in exposure to radiation.

Tags may either be read-only, having a unique, factory-assigned serial number that is used as a key into a database, or may be read/write, where object-specific data can be written into the tag by the system user. Field programmable tags may be write-once, read-multiple; "blank" tags may be written by a user with an electronic product code.

RFID tags contain at least three parts: an integrated circuit for storing and processing information that modulates and demodulates a radio-frequency (RF) signals; a means of collecting DC power from the incident reader signal, and an antenna for receiving and transmitting the signal. The tag information is stored in a non-volatile memory. The RFID tag includes either fixed or programmable logic for processing the transmission and sensor data, respectively.

An RFID reader transmits an encoded radio signal to interrogate the tag. The RFID tag receives the message and then responds with its identification and other information. This may be limited to a unique tag serial number or it may be product-related information such as a stock number, lot or batch number, production date, or other specific information. Since tags have individual serial numbers, the RFID system design can discriminate among several tags that might be within the range of the RFID reader and read them simultaneously.

A passive tag which operates in the so-called "ISM band" of frequencies (902-928 MHz in North America and 865-868 MHz in Europe) can be made inexpensively (about ten cents per tag) and attached to, or inserted into any item that is to be identified.

SUMMARY OF THE INVENTION

A principal objective of the present invention is to provide a method and apparatus for alerting security personnel that a gun has entered a defined protected area, hereinafter sometimes referred to as a "safe zone." Safe zones are well known in the field of aviation. They are sometimes called "no-fly zones" or "protected areas" and are designed to prevent incursion into certain areas by certain types of aircraft: military aircraft, commercial aircraft, private aircraft and drones.

This objective, as well as other objectives that will become apparent from the discussion that follows, are achieved, according to the present invention by a method that comprises the steps of:
(a) downloading to an app-enabled, and GPS-enabled, smartphone the coordinates of one or more safe zones in which the unauthorized presence of guns is prohibited;
(b) when said smartphone enters a safe zone, sensing the presence of any gun that is in the vicinity of said smartphone; and
(c) if the presence of a gun is sensed in the vicinity of said smartphone, transmitting an alert message by means of said smartphone to a central office for the attention of security forces.

The smartphone, or an electronic device coupled to the smartphone, must have the capability of sensing the presence of the tag. In a preferred embodiment, the smartphone (or a separate, coupled device) has the capability of reading information, such as an ID number, from the tag.

The tag may, for example, be the type of tag inserted in books and/or placed on clothing at bookstores and clothing stores, respectively, that can be sensed at the store exits to prevent theft.

In a preferred embodiment of the invention the alert is transmitted repeatedly and includes the GPS coordinates, as well as the identity, of the smartphone. Since the smartphone is registered to a particular owner, the security office can quickly determine:
(1) the identity of the gun; and
(2) where the gun is located.

The apparatus according to the invention includes:
(a) a smartphone app for carrying out the method described above; and
(b) a tag, attached to the gun.

BRIEF DESCRIPTION OF THE DRAWING

The sole FIG. 1 is a representational diagram of the system according to the invention (both method and apparatus) for generating an alert that a gun has entered a protected area ("safe zone").

BRIEF DESCRIPTION OF THE PREFERRED EMBODIMENTS

For the present system to function properly, a law must be passed requiring that all guns be provided with at least one active or passive tag, such as an RFID tag. While enacting such a law may seem to be a tall order considering the politics of the day, the advantages of doing so are so compelling that one wonders why any government representative or official would vote against it.

Some RFID tags are so inexpensive, especially when made in vast quantities, that they could be given away to every gun owner. Assuming there to be an estimated 250 million guns in the United States, the purchase cost, at ten cents a tag, would be only $25M, a small sum to invest considering that children's lives are at stake. To avoid objections as to the cost burden upon gun owners for adding tags to their guns, the tags could be purchased at taxpayer expense and given to gun owners free of charge to apply to their guns.

Any law requiring the application of a tag to each gun must, of course, allow sufficient time for all gun owners to comply. However, there would have to be a strict deadline which, if not met by the holder of any gun, would have to result in a monetary penalty.

Prior to reaching the deadline, a suitable app would need to be available for download to a goodly number of smartphones: an app that includes the GPS coordinates of all of the "safe zones" in each smartphone's vicinity. With such an app, any such app-enabled, and GPS-enabled, smartphone that finds itself within a safe zone activates a built-in tag reader to sense the presence of nearby gun tags, if any. If such a gun tag is sensed, the identity code of that tag is read and thereafter transmitted to a central security office.

At the central office a determination is immediately made as to whether the tagged gun is, or is not, permitted to be in the safe zone. This is done by comparing the incoming identity code of the tag with a list of identity codes of those tagged guns that are allowed to be in the zone, such as the guns of police officers, security guards, etc. If the central office determines that the tagged gun found to be present in the safe zone is not authorized to be there, a call is made to police officers within or near the safe zone, alerting them to the safety threat in the area.

The elements of the apparatus according to the invention are illustrated in attached FIG. 1.

FIG. 1 shows a map of an area having a school "safe zone" 10 which is to be protected against the use of firearms. The safe zone surrounds a school building 11 and the school grounds 12 which include a school children's playground. A person 13, who has entered the safe zone, is carrying both an app-enabled smartphone 14 and a gun 16 having a gun tag 18. The smartphone 14, or a device electronically coupled to the smartphone, senses the presence of the tag 18 when the GPS system of the smartphone determines that the person 13 has entered the safe zone. The reading of the tag 18 is indicated by the dashed line 14*a*.

A nearby person 15, perhaps on his way to school and carrying school books 17 as well as an app-enabled, and GPS-enabled, smartphone 19, has also entered the safe zone 10. This smartphone also senses the presence of the tag 18 on the gun 16.

When the person 13 entered the safe zone 10, this person's smartphone wirelessly transmitted a silent alert, with the GPS coordinates as well as the identity code of the smartphone, and the identity code of the tag 18, to a central security office 20. Similarly, when the person 15 entered the safe zone and sensed the presence of the gun tag 18, his smartphone 19 also transmitted an alert to the central office 20, with the GPS coordinates and the identity code of the smartphone 19 and the identity code of the tag 18. In this latter case, the smartphone 19 preferably also generated a text message for the person 15, warning this person 15 of the presence of the gun 16.

The security office 20 can then take remedial action by communicating with one or more local security officers near the site of the safe zone 10, such as officer 22, informing him/her of the exact location of the person 13 with the gun 16. The tagged gun or guns carried by the police officers are, of course, permitted to enter and remain in the safe zone.

If the person 13 reaches the school building 11 without being intercepted and stopped by the security officer 22, a tag reader 24 at the door of the school building senses the presence of the tag 18 on the gun 16 and transmits an alert to the central office 20. In this case, the alert includes the identity code of the tag 18 and the identity of the school 11.

There has thus been shown and described a novel method and apparatus for generating an alert when a gun has entered a safe zone, which method and apparatus fulfill all of the objects and advantages sought therefor. Many changes, variations and other uses and applications of the present invention will become apparent to those skilled in the art after considering this specification and the accompanying drawings. All such changes, variations and other uses and applications which do not depart from the spirit and scope of the invention are deemed to be covered by the claims that follow.

What is claimed is:

1. A method for alerting security personnel that a gun has entered a defined protected area (a "safe zone"), said method comprising the steps of:
   (a) downloading to an app-enabled, and GPS-enabled, smartphone the coordinates of a safe zone in which the unauthorized presence of a gun is prohibited;
   (b) sensing the presence of any gun that is in the safe zone, including sensing an identity code associated with the gun in the safe zone, wherein a transponder tag on the gun in the safe zone responds to a received interrogation by transmitting a response with the identity code;
   (c) when the presence of the gun is sensed in the safe zone, transmitting an alert message by means of said smartphone to a central office for the attention of security forces, said alert message including the GPS coordinates of said smartphone, along with the identity code of the tag;
   (d) determining, at the central office, based on the identity code of the tag and GPS coordinates, whether the gun is permitted inside the safe zone; and
   (e) when the gun in the safe zone is not permitted inside the safe zone, transmitting a message to security forces capable of interdicting the gun.

2. The method defined in claim 1, wherein step (b) includes the step of sensing the presence of a metal object in the safe zone.

3. The method defined in claim 1, wherein the identity code associated with the gun is on a radio frequency identification (RFID) tag.

4. The method defined in claim 1, wherein step (e) further includes the step of transmitting a message to at least one person inside a building in the safe zone.

5. The method defined in claim 1, wherein step (b) includes the step of sensing the presence of the gun at the entryway to a building inside the safe zone.

* * * * *